（12）United States Patent
Ehre et al.

(10) Patent No.: US 9,303,713 B2
(45) Date of Patent: Apr. 5, 2016

(54) PISTON-CYLINDER UNIT

(75) Inventors: Thomas Ehre, Koblenz (DE); Michael Hewel, Boppard Udenhausen (DE); Nadja Kaiser, Koblez (DE); Axel Knopp, Eitelborn (DE); Ralf Rissel, Saffig (DE); Arnold Schilz, Lahnstein (DE)

(73) Assignee: Stabilus GmbH, Koblenz (DE)

( * ) Notice: Subject to any disclaimer, the term of this patent is extended or adjusted under 35 U.S.C. 154(b) by 1158 days.

(21) Appl. No.: 12/833,328

(22) Filed: Jul. 9, 2010

(65) Prior Publication Data

US 2011/0005387 A1 Jan. 13, 2011

(30) Foreign Application Priority Data

Jul. 10, 2009 (DE) .......................... 10 2009 032 897

(51) Int. Cl.
*F16F 9/32* (2006.01)
*F16F 9/02* (2006.01)
*F15B 15/28* (2006.01)

(52) U.S. Cl.
CPC ........... *F16F 9/3292* (2013.01); *F15B 15/2861* (2013.01); *F15B 15/2876* (2013.01); *F15B 15/2884* (2013.01); *F16F 9/0218* (2013.01)

(58) Field of Classification Search
CPC ... F16F 9/0218; F16F 9/3292; F15B 15/2884; F15B 15/2876; F15B 15/2861
USPC ......... 92/5 R, 85 A, 85 B, 85 R; 91/1; 73/745
See application file for complete search history.

(56) References Cited

U.S. PATENT DOCUMENTS

| 3,406,572 | A | | 10/1968 | Robillard |
| 3,793,498 | A | * | 2/1974 | Matsui et al. .......... 200/61.45 R |
| 3,909,035 | A | * | 9/1975 | Aikawa ..................... 280/6.158 |
| 4,054,295 | A | * | 10/1977 | Elliott ........................ 280/6.159 |
| 4,333,668 | A | * | 6/1982 | Hendrickson et al. ..... 280/5.507 |
| 4,608,870 | A | * | 9/1986 | Huber et al. .................... 73/708 |
| 4,732,408 | A | * | 3/1988 | Ohlin ............................. 188/284 |
| 4,788,489 | A | * | 11/1988 | Kobayashi et al. ........... 324/660 |
| 4,898,027 | A | * | 2/1990 | Morra ........................ 73/117.01 |
| 5,246,247 | A | * | 9/1993 | Runkel ....................... 280/5.503 |
| 5,360,230 | A | * | 11/1994 | Yamada et al. ............ 280/5.515 |

(Continued)

FOREIGN PATENT DOCUMENTS

| DE | 1188247 | * | 4/1965 |
| JP | 42-16781 | | 9/1942 |
| WO | WO2008/074317 | * | 6/2008 |

OTHER PUBLICATIONS

DE 1188247 English machine translation of "Description" from Espacenet. 1965.*

*Primary Examiner* — Edward Look
*Assistant Examiner* — Michael Quandt
(74) *Attorney, Agent, or Firm* — Cozen O'Connor

(57) ABSTRACT

A piston-cylinder unit with a center longitudinal axis, a first end, a cylinder filled with a fluid, a piston arranged so as to be displaceable in the cylinder and which divides the cylinder into a first work space remote of the first end and a second work space close to the first end. A piston rod is arranged at the piston and projects through the first work space and is guided out of the cylinder concentric to the center longitudinal axis at a second end opposite the first end so as to be sealed by a guiding and sealing device, and a sensor device for direct or indirect detection of the internal pressure of the piston-cylinder unit.

8 Claims, 14 Drawing Sheets

(56) References Cited

U.S. PATENT DOCUMENTS

| | | | |
|---|---|---|---|
| 5,490,425 A * | 2/1996 | Raj et al. | 73/745 |
| 6,346,806 B1 * | 2/2002 | Schabuble et al. | 324/207.14 |
| 6,413,179 B1 * | 7/2002 | Koike | 474/109 |
| 6,561,022 B1 * | 5/2003 | Doyle et al. | 73/313 |
| 6,666,784 B1 * | 12/2003 | Iwamoto et al. | 474/109 |
| 6,698,729 B2 * | 3/2004 | Popjoy | 267/64.28 |
| 6,978,818 B1 * | 12/2005 | Vicktorius et al. | 156/556 |
| 7,364,214 B2 * | 4/2008 | Park | 296/76 |
| 8,196,721 B2 * | 6/2012 | Gabriel et al. | 188/274 |
| 8,476,896 B2 * | 7/2013 | Mednikov | 324/207.15 |
| 2006/0075892 A1 * | 4/2006 | Dorr | 92/5 R |
| 2007/0245890 A1 * | 10/2007 | Colli et al. | 92/5 R |
| 2008/0148809 A1 * | 6/2008 | Haney et al. | 73/11.04 |

* cited by examiner

PISTON-CYLINDER UNIT

BACKGROUND OF THE INVENTION

Field of the Invention

The invention is directed to a piston-cylinder unit with a center longitudinal axis, a first end, a cylinder filled with a fluid, a piston which is arranged so as to be displaceable in the cylinder and which divides the cylinder into a first work space remote of the first end and a second work space close to the first end, a piston rod which is arranged at the piston and which projects through the first work space and is guided out of the cylinder concentric to the center longitudinal axis at a second end opposite from the first end so as to be sealed by a guiding and sealing device, and a sensor device for direct or indirect detection of the internal pressure of the piston-cylinder unit.

SUMMARY OF THE INVENTION

An object of the invention is to determine the internal pressure of the piston-cylinder unit and to indicate excessive loss of pressure.

In one embodiment, the sensor device is arranged in the piston-cylinder unit so that it is protected from contamination.

Alternatively, the sensor device is arranged outside the piston-cylinder unit so that standard components can be used for the piston-cylinder unit.

According to one embodiment of the invention, the piston-cylinder unit is sealed in a gas-tight manner at the first end by a closing element, and the sensor device is arranged on the side of the closing element facing the piston, which results in a simple assembly.

In one embodiment, the closing element forms the sensor housing or all of the components of the sensor device are embedded in the closing element and at least one line is guided in a gastight manner from the sensor device through the closing element to a control device.

In one embodiment, the sensor device is arranged laterally at the cylinder, which offers the advantage of a short constructional length in axial direction.

In one embodiment, the sensor device comprises an RFID element, wherein a cap-like external reading module is fitted to the first end of the piston-cylinder unit which is in turn connected to the control device by the at least one line.

Alternatively, the sensor device can be arranged on the piston, and the at least one line is guided outward via a bore hole in the piston rod.

A reliable and accurate sensing is made possible in that a dividing piston divides the second work space into a first partial space near the piston and a second partial space remote of the piston by a sealing ring. A spring element accommodated in the second partial space is arranged between the dividing piston and the closed first end, wherein the stroke of the dividing piston in direction of the piston is limited by one or more recesses in the cylinder, and the sensor device is arranged in proximity to the recess.

The sensor device advantageously comprises a Hall sensor or reed sensor.

In one embodiment, the Hall sensor is pre-loaded by a magnet, and the dividing piston is made of ferromagnetic material.

Alternatively, the sensor device comprises a coil, and the coil is part of a resonant circuit whose other components are accommodated in the control device.

The sensor device can comprise a capacitor, and the capacitor is part of a resonant circuit whose other components are accommodated in the control device.

In one embodiment, the sensor device comprises a path sensor in the form of a magnetic foil sensor, and the dividing piston is constructed as a magnet.

In one embodiment, the sensor device has a primary coil and at least one secondary coil, wherein the primary and secondary coils are operated as transformers.

In one embodiment, the sensor device has electrically conducting contact elements, an electric connection is arranged at the piston rod, and an electric connection is arranged at the cylinder, wherein the piston rod and the cylinder are non-conductively connected to one another by the electrically insulated piston and the sealing and guiding device, and a wiper contact is arranged at the dividing piston and connects the dividing piston to the cylinder so as to be electrically conducting.

In one embodiment, the sensor device is arranged at the piston rod or at the piston and comprises an ultrasonic sensor, a micro switch, or a laser sensor.

Alternatively, the sensor device is arranged at the dividing piston, and the at least one line is guided through the dividing piston and the second partial space located behind the latter and through the cylinder out of the piston-cylinder unit to the control device.

In one embodiment, the sensor device is accommodated in the area of the piston rod which always remains outside the cylinder.

In one embodiment, the piston-cylinder unit is arranged to be displaceable axially in a cover tube, wherein the first connection element is located in the cover tube and is connected to a pin arranged transverse to the center longitudinal line, and the pin extends through two elongated holes in the cover tube.

In one embodiment, a spring element is arranged on the side of the pin opposite the piston-cylinder unit and supported at the base of the cover tube and exerts a force against the pin which is less than the extension force of the piston-cylinder unit in normal operation.

In one embodiment, the sensor device is arranged near the end of one of the elongated holes remote of the base and is connected to the control device by the at least one line.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiment examples of the invention are shown in the drawings and are described more fully in the following.

DETAILED DESCRIPTION OF THE PRESENTLY PREFERRED EMBODIMENTS

Figure 1:
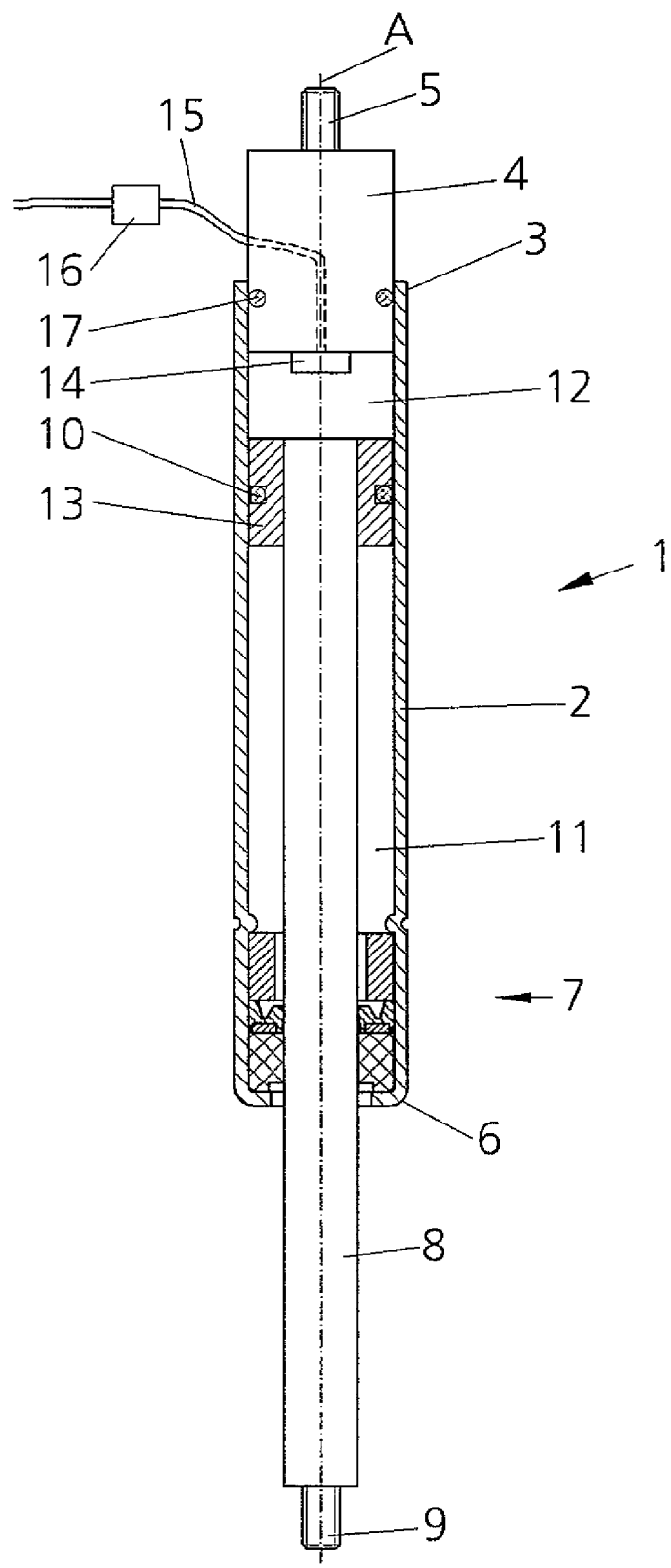
FIG. 1 is a first embodiment of the invention.

FIG. 1 is a the longitudinal section through a piston-cylinder unit 1, in this case represented as a gas spring, with a cylinder 2 having a first end 3 which is closed in a gastight manner by a closing element 4. A first connection device 5 in the form of a threaded stem is arranged concentric to the center longitudinal axis A at the front side outside the closing element 4. A sealing and guiding device 7 by which a piston rod 8 is sealed concentric to the center longitudinal axis A and guided outward so as to be axially movable is arranged at the second end 6 of the cylinder 2 opposite the first connection device 5. A second connection device 9 is located at the outwardly projecting end of the piston rod 8. Knuckle eyes or ball sockets are arranged at the connection device 5 and 9. By these knuckle eyes or ball sockets, the piston-cylinder unit 1 can be fastened to a stationary component part e.g., a vehicle body, on one side and, on the other side, to a swiveling part, e.g., a trunk lid or engine hood, which is swivelable relative to the stationary component part.

A piston 13 provided with a sealing ring 10 divides the cylinder 2 into a first work space 11 on the piston rod side and a second work space 12 remote of the piston rod arranged at the end of the piston rod 8 opposite the second connection device 9. The piston 10 is only shown schematically and can have flow connections through which a fluid, preferably a nitrogen gas under pressure, can flow from the first work space 8 to the second work space 9, or vice versa. At least one additional flow connection, can be provided by a groove extending axially in the cylinder 2.

A sensor device 14 comprising, for example, a pressure sensor, a strain gauge or a dynamometer is arranged at the side of the closing element 4 facing the piston 13. The closing element 4 can be constructed so that it forms the sensor housing or in such a way that all of the component parts are embedded in the closing element so that there is no loss of travel in axial direction. At least one line 15 is guided through the closing element 4 in a gastight manner from the sensor device 14 to a control device 16, e.g., the control module of a motor vehicle.

The closing element 4 has an outer thread, which is screwed into an inner thread, formed at the first end 3 of the cylinder 2. The first end 3 is closed in a gastight manner by a seal device 17.

The closing element 4 can also be fastened to the first end 3 by another suitable arrangement, for example, by welding or by a circumferential groove or a plurality of recesses arranged in circumferential direction in the cylinder 2, or by crimping.

When the piston-cylinder unit is filled with a fluid, the sensor 14 measures the filling pressure inside the cylinder 2. On the one hand, power is supplied to the sensor device 14 through a line 15; on the other hand, this line 15 has the function of conveying the measurements of the filling pressure to the control device 16 of the vehicle. The filling pressure can be displayed at any time by the control device. When there is a drop in pressure below a given reference quantity, an alarm prompt can signal an error message. The error message can be visual or aural.

Figure 2:
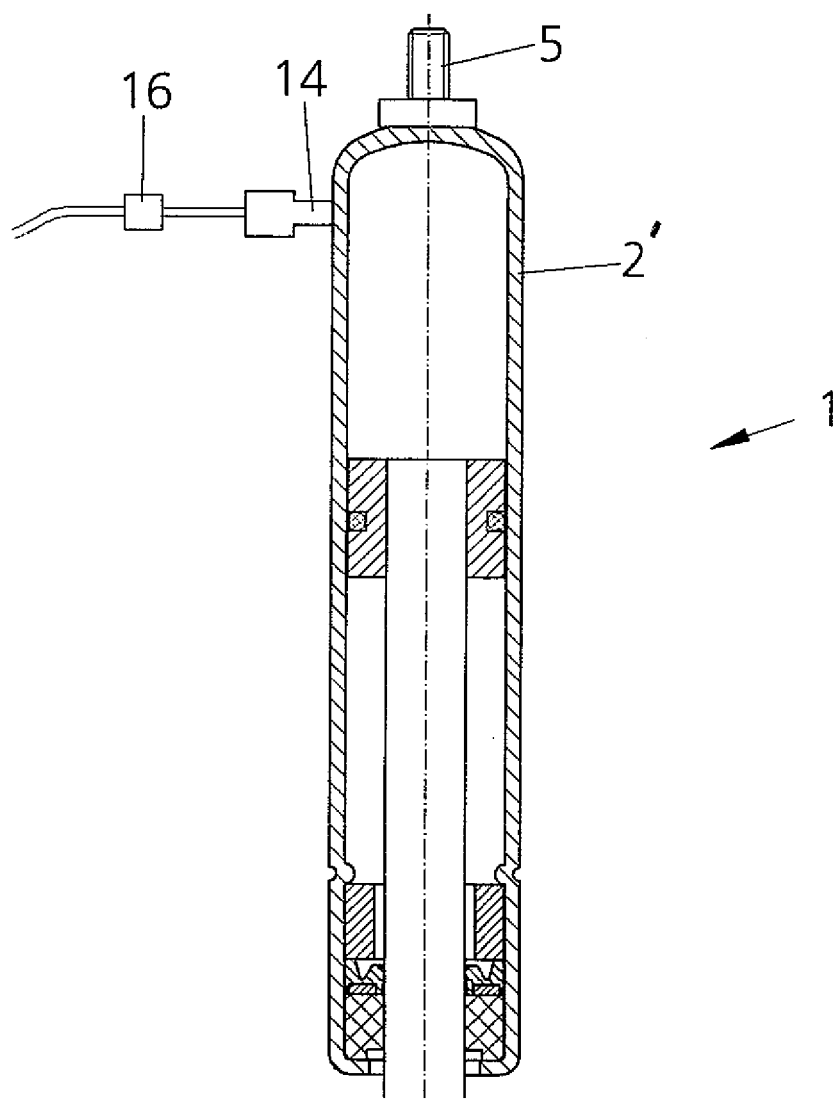
FIG. 2 is a second embodiment of the invention.

As can be seen from FIG. 2, the sensor device 14 can also be arranged laterally at the cylinder 2' of the piston-cylinder unit 1. The cylinder 2' is closed in a gastight manner by flanging the first end and welding on the connection element 5.

Figure 3:
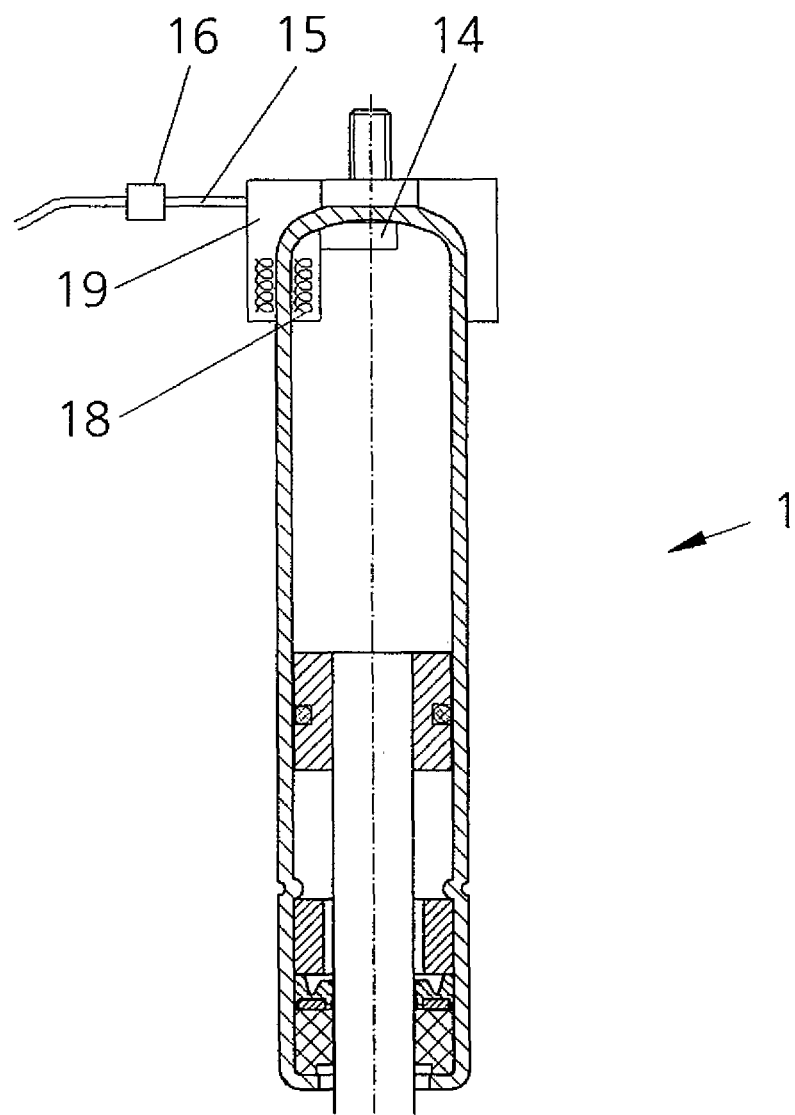
FIG. 3 is a third embodiment of the invention.

Another embodiment form of the invention for measuring the filling pressure of the piston-cylinder unit is shown in FIG. 3. A sensor device 14 for measuring the filling pressure is arranged in the cylinder 2. The power supply and measured values are transmitted by an RFID element 18. This has the advantage that no line need be guided through the cylinder 2 and sealed. The cylinder 2 is preferably made of a paramagnetic material, e.g., aluminum. A cap-like external reading module 19 can be fitted to the first end 3 of the piston-cylinder unit 1 which is in turn connected to the control device 16 by the at least one line 15.

Figure 4:
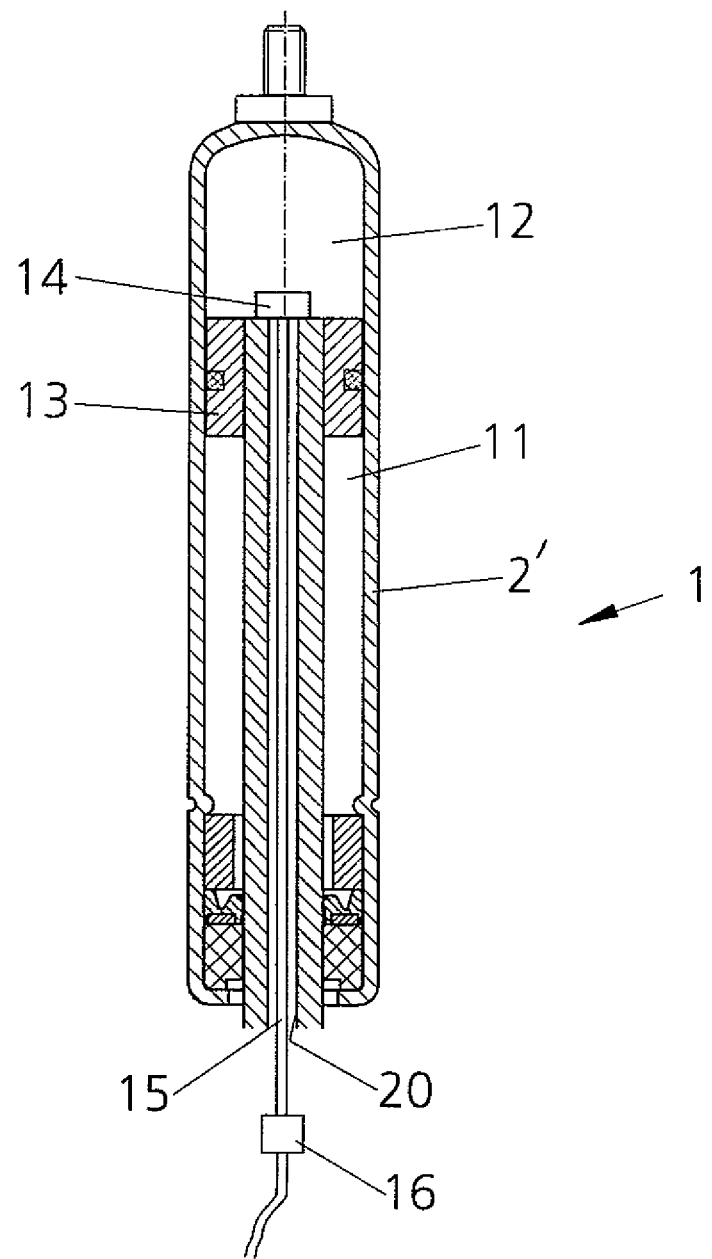
FIG. 4 is a fourth embodiment of the invention.

In the embodiment form of the piston-cylinder unit 1 shown in FIG. 4, the sensor device 14 is fastened to the piston 13 and measures the filling pressure in the cylinder 2'. The at least one line 15 is guided outward via a bore hole 20 in the piston rod 8. The line 15 must be sealed in a gastight manner to prevent gas loss in the work spaces 11 and 12.

Figure 5:
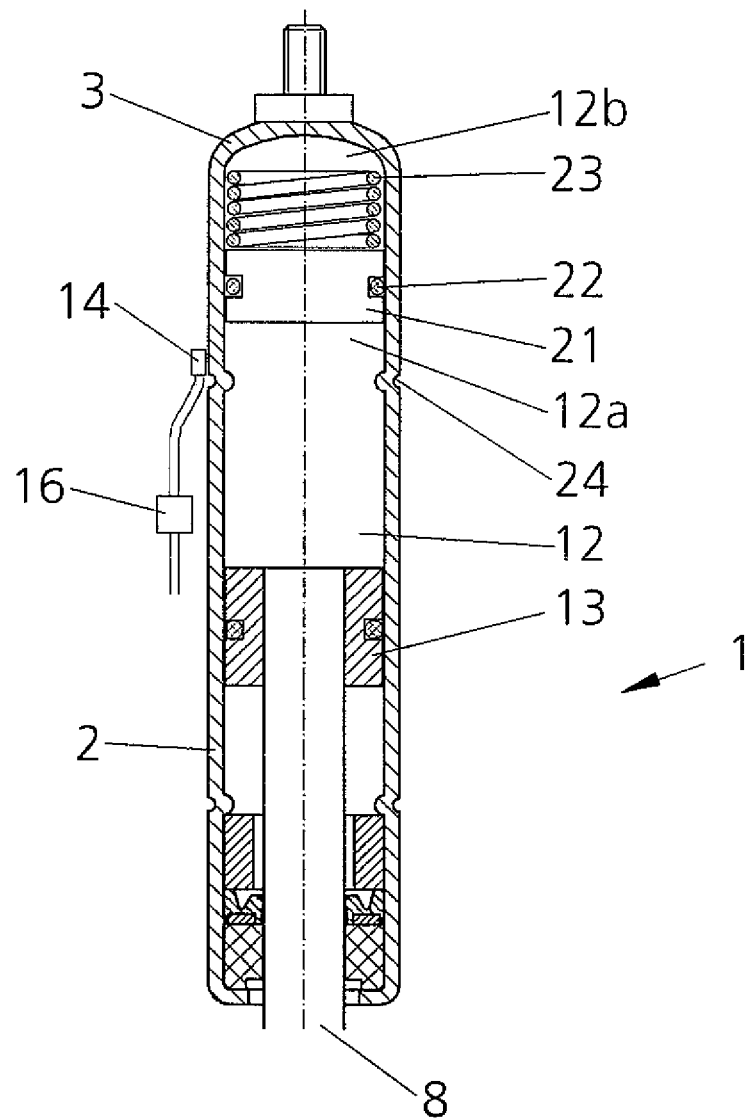
FIG. 5 is a fifth embodiment of the invention.

In the embodiment form shown in FIG. 5, an indirect sensing of the filling pressure of the piston-cylinder unit 1 is carried out by a dividing piston 21. A position sensor can be used as the sensor device 14. This position sensor can be a Hall sensor, a reed sensor, or a magnetic switch. The dividing piston 21 divides the second work space 12 into a first partial space 12a near the piston 13 and a second partial space 12b remote of the piston 13 by a sealing ring 22.

A spring element 23, which is accommodated in the second partial space 12b, is inserted with the dividing piston 21 into the pressure tube. The spring element 23 is supported at the closed first end 3. By one or more recesses 24 in the cylinder 2, known in the art as grooves or dinks, the stroke of the dividing piston 21 is limited to this position in case of insufficient filling pressure. The stroke range of the piston 13 and piston rod 8 ends before this position.

When atmospheric pressure prevails in the second partial space 12b and the piston-cylinder unit is filled to its nominal value, the dividing piston 21 is compressed relative to the spring element 23 because of the filling pressure. The sensor device 14 is arranged at the recess 24, which makes it possible to detect the position of the dividing piston 21. When the Hall sensor is pre-loaded by a magnet, the dividing piston 21 can be made of ferromagnetic material.

If the filling pressure drops below a given threshold, the spring force of the spring element 23 pushes the dividing piston 21 in the direction of the piston 13 until the recess 24. Accordingly, the magnetic field of the pre-loaded Hall sensor is rerouted via the dividing piston 21 by the ferromagnetic material of the dividing piston 21, and the sensor device 14 triggers the alarm for insufficient filling pressure. If the Hall sensor is not pre-loaded by a magnet, the dividing piston 21 constructed as a magnet. The sensor device 14 can also have other magnetic sensors, e.g., a reed switch. The cylinder 2 is made of paramagnetic material in order to ensure the functioning of the sensor device 14.

It should be noted that the spring element 23 can be, for example, a helical compression spring, one or more disk springs, or a gas-filled bag, or the space 12b is filled with a gas under pressure.

Figure 6:
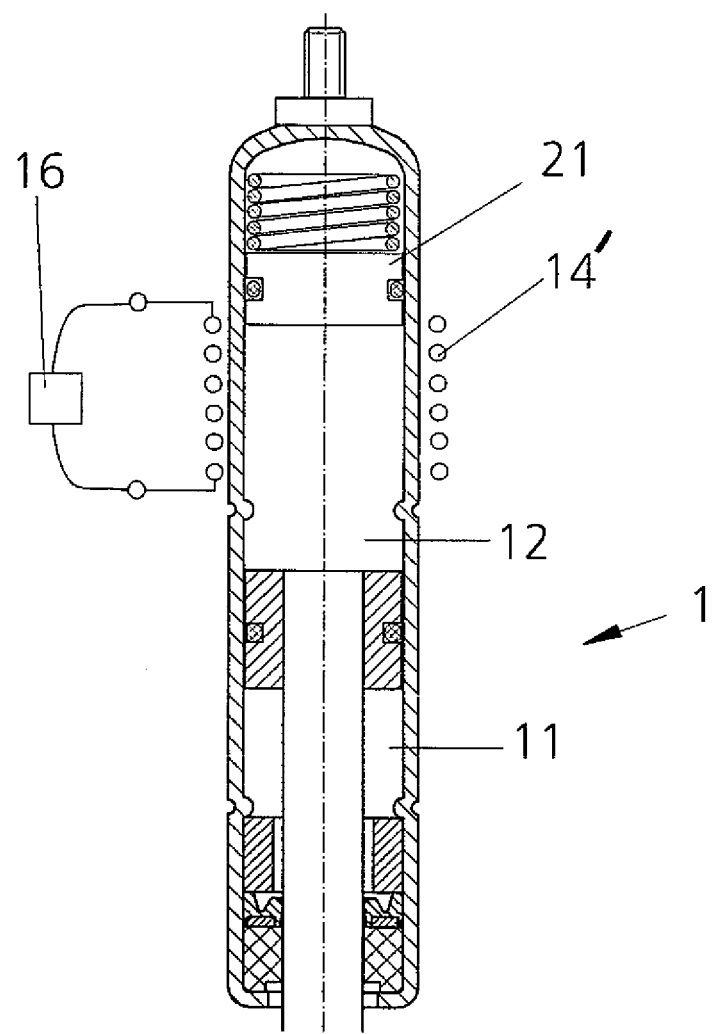
FIG. 6 is a sixth embodiment of the invention.

The construction and the functioning of the embodiment form of the piston-cylinder unit 1 shown in FIG. 6 substantially corresponds to the embodiment form shown in FIG. 5, except that the sensor device 14' comprises a coil. The coil is part of a resonant circuit whose other components are accommodated in the control device 16. When the dividing piston 21 slides into the coil due to a decreasing pressure in the work spaces 11 and 12, the inductance of the coil changes due to the ferromagnetic core. This change can be detected by the resonant circuit, e.g., by the frequency. Further, it is possible to gather information about the filling pressure of the piston-cylinder unit.

Figure 7:
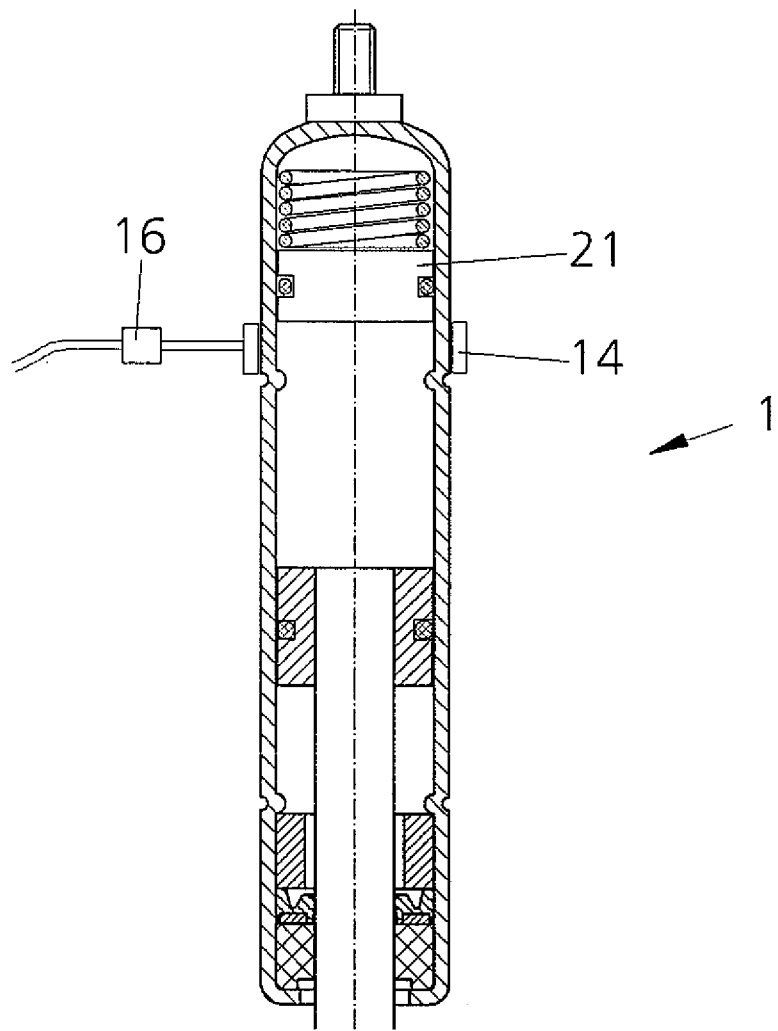
FIG. 7 is a seventh embodiment of the invention.

The construction and functioning of the embodiment form of the piston-cylinder unit 1 shown in FIG. 7 also substantially corresponds to the embodiment form shown in FIG. 5, except that the sensor device 14 comprises a capacitor. The capacitance of the capacitor changes based on the position of the dividing piston 21 inside the capacitor. In a manner similar to that in the embodiment form in FIG. 6, an evaluation of the filling pressure can be carried out by the resonant circuit by the change in frequency.

Figure 8:
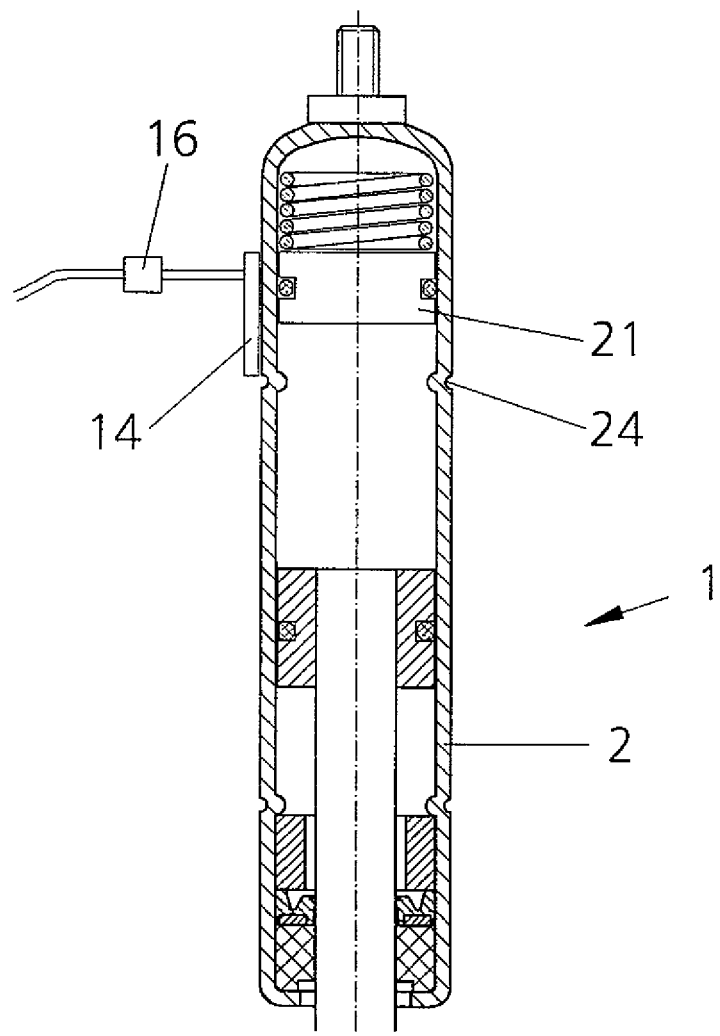
FIG. 8 is an eighth embodiment of the invention.

The embodiment form shown in FIG. 8 substantially corresponds to the embodiment form shown in FIG. 5. However, the sensor device 14 comprises a path sensor in the form of a magnetic foil sensor, and the dividing piston 21 is constructed as a magnet. The path sensor makes it possible to detect the position of the dividing piston 21. In this way, it is possible to indirectly determine the filling pressure of the piston-cylinder unit. The closer the dividing piston 21 advances toward the recess 24, the lower the filling pressure of the piston-cylinder unit 1. The cylinder 2 is made of paramagnetic material for reliable operation of the path detector.

Figure 9:
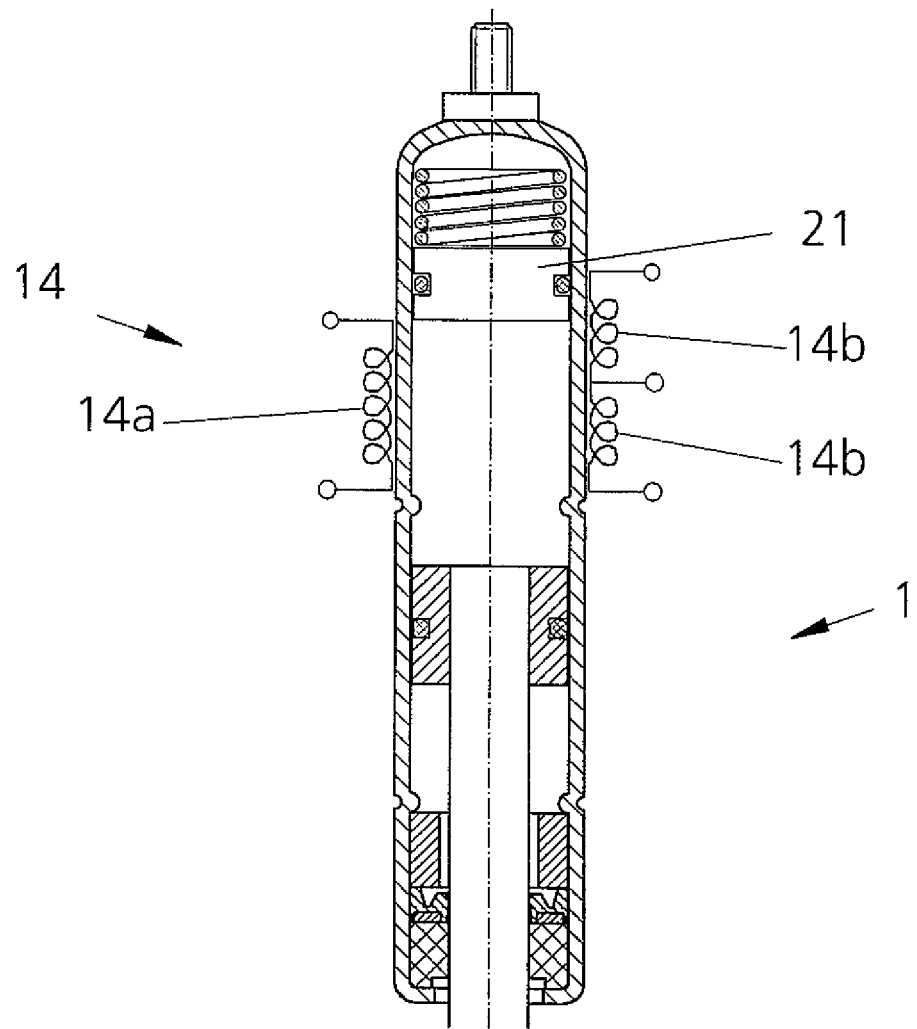
FIG. 9 is a ninth embodiment of the invention.

An alternative embodiment form of the invention is shown in FIG. 9. The sensor device 14 comprises a primary coil 14*a* and at least one secondary coil 14*b*. However, a plurality of secondary coils 14*b* are preferably used and are connected in series in order to obtain more accurate measurements. The primary and secondary coils are operated with AC voltage or voltage pulses, or the like. When the dividing piston 21 of ferromagnetic material is displaced within the magnetic field, the transfer ratio of the transformer changes from the primary coil 14*a* to the secondary coils 14*b*. This changes the induced voltage in the secondary coils 14*b*. A measurement of the position of the dividing piston is made possible by taking the voltage difference between the secondary coils 14*b*. A good assessment of the filling pressure of the piston-cylinder unit 1 can be made in this way.

Figure 10:
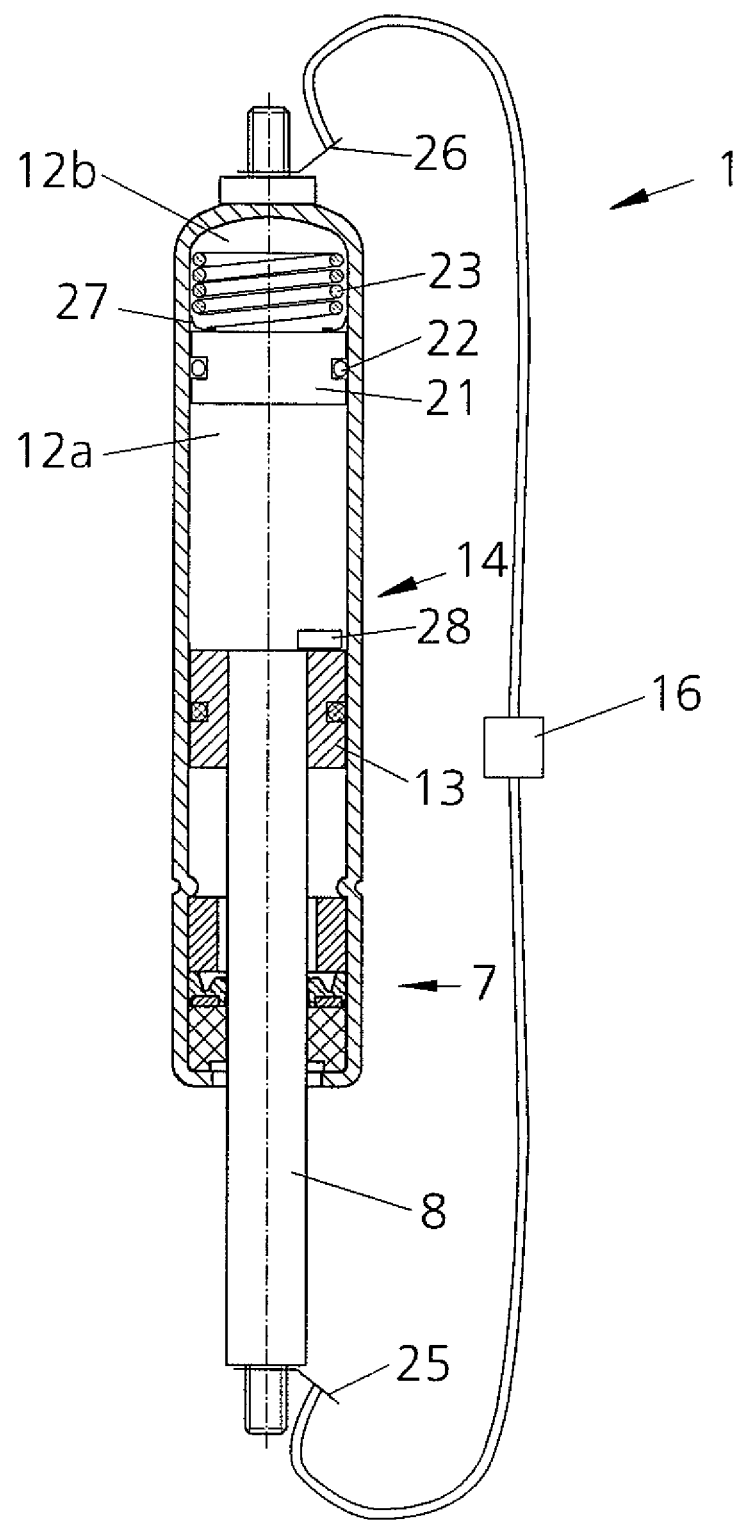
FIG. 10 is a tenth embodiment of the invention.

FIG. 10 shows another embodiment of the invention in which an electric connection 25 is arranged at the piston rod 8 and an electric connection 26 is arranged at the cylinder 2. The piston rod 8 and the cylinder 2 are connected to one another non-conductively by the electrically insulated piston 13 and the sealing and guiding device 7. The purpose of the sealing ring 22 at the dividing piston 21 is to seal the second partial space 12*b*, in which the spring element 23 is located, relative to the first partial space 12*a* in a gastight manner. A wiper contact 27, which connects the dividing piston 21 to the cylinder 2 in an electrically conductive manner, is arranged at the dividing piston 21.

The dividing piston 21 is moved out of the stroke area of the piston 13 by the filling pressure of the piston-cylinder unit 1. If the filling pressure of the piston-cylinder unit decreases below the specified nominal value, the dividing piston 21 is displaced in direction of the piston rod 8. When the dividing piston 21 is in the stroke area of the piston 13, the piston rod 8 is connected in an electrically conducting manner to the cylinder 2 by the dividing piston 21 with the wiper contact 27. This can be carried out by a separate contact 28 connected to the piston rod. Detection is carried out in that the dividing piston 21 touches the contact 28. In so doing, the switching function is carried out by electrical contact through the electrically conducting connection between the piston rod 8, dividing piston 21, wiper contact 27, and cylinder 2.

However, detection can also be carried out by the piston rod 8 extending beyond the piston 13 when, for example, the piston 13 is fastened to the piston rod 8 by means of a rivet head or screw nut.

Figure 11:
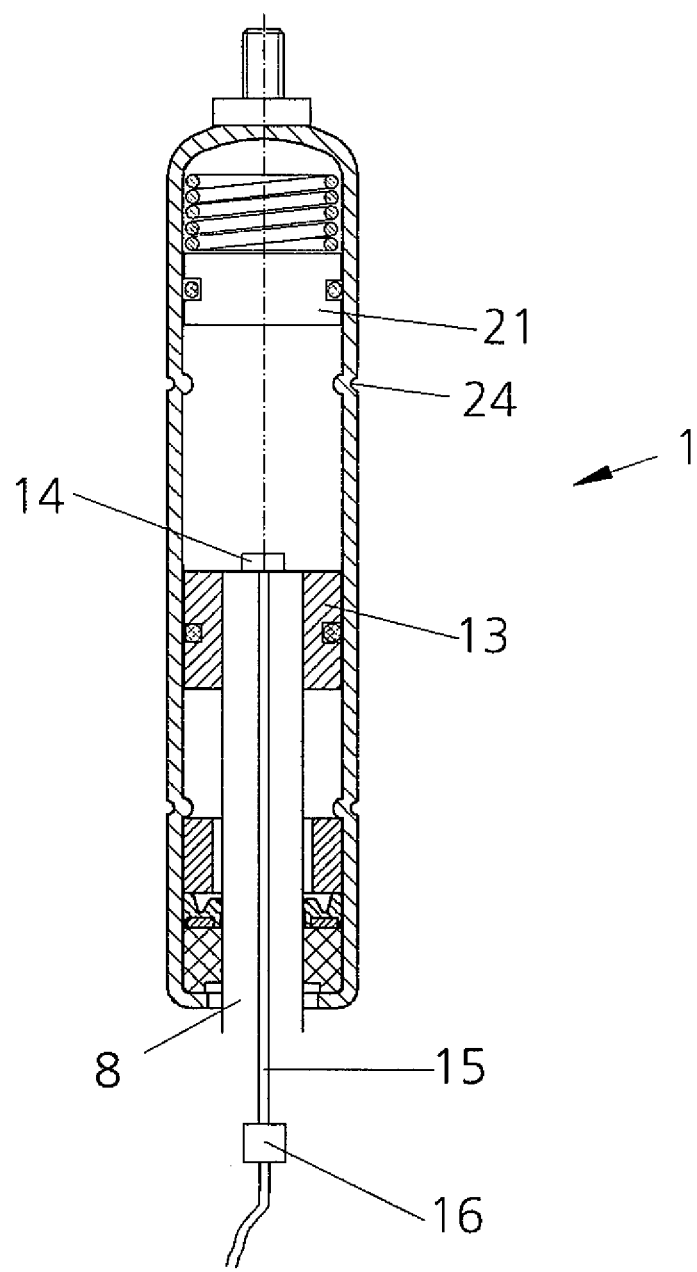
FIG. 11 is an eleventh embodiment of the invention.

In the embodiment shown in FIG. 11, the sensor device 14 is arranged at the piston rod 8 or at the piston 13. The sensor device 14 can have, e.g., an ultrasonic sensor, a micro switch, or a laser sensor. The measurement should be performed in such a way that a minimum distance is maintained between the piston 13 and the dividing piston 21, i.e., when the piston-cylinder unit 1 loses pressure, the dividing piston 21 extends up to the recess 24. The error message is triggered only when the piston-cylinder unit 1 is moved in completely. The micro switch is then actuated by the dividing piston 21. The electric signals of the sensor device 14 are sent to the control device 16 via line 15.

Figure 12:
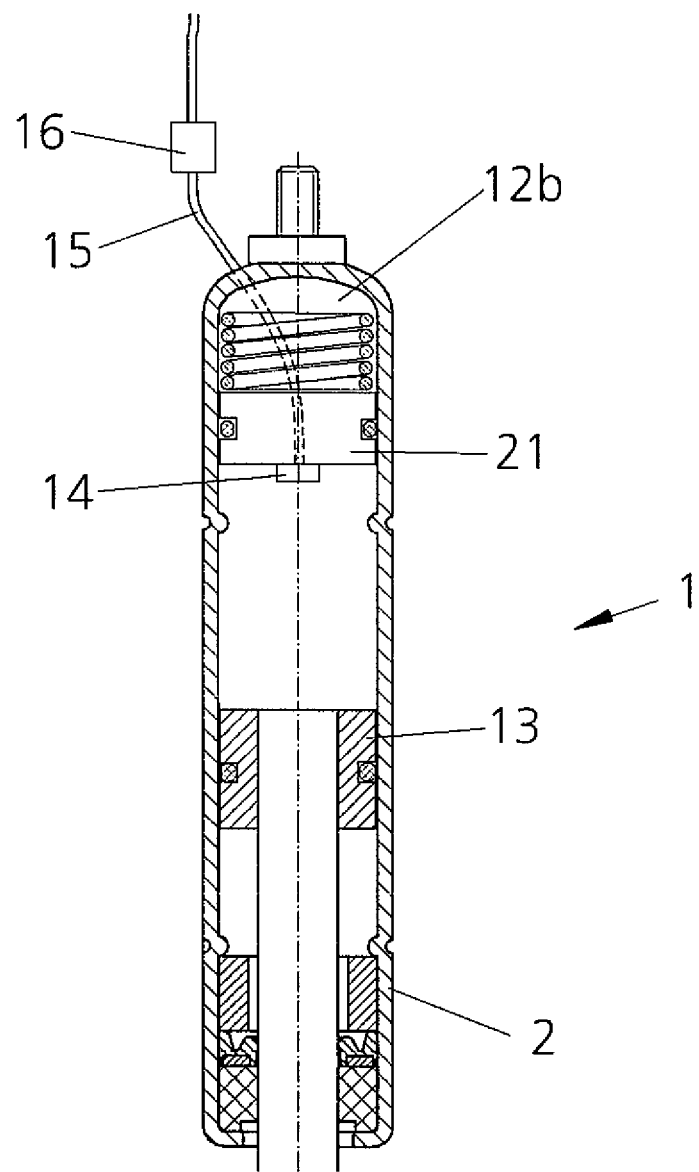
FIG. 12 is a twelfth embodiment of the invention.

The embodiment form shown in FIG. 12 functions in the same manner as the embodiment of FIG. 11. However, the sensor device 14 is arranged at the dividing piston 21, and the at least one line 15 is guided through the dividing piston 21 and the partial space 12*b* located behind the latter and through the cylinder 2 out of the piston-cylinder unit 1 to the control device 16.

Figure 13:
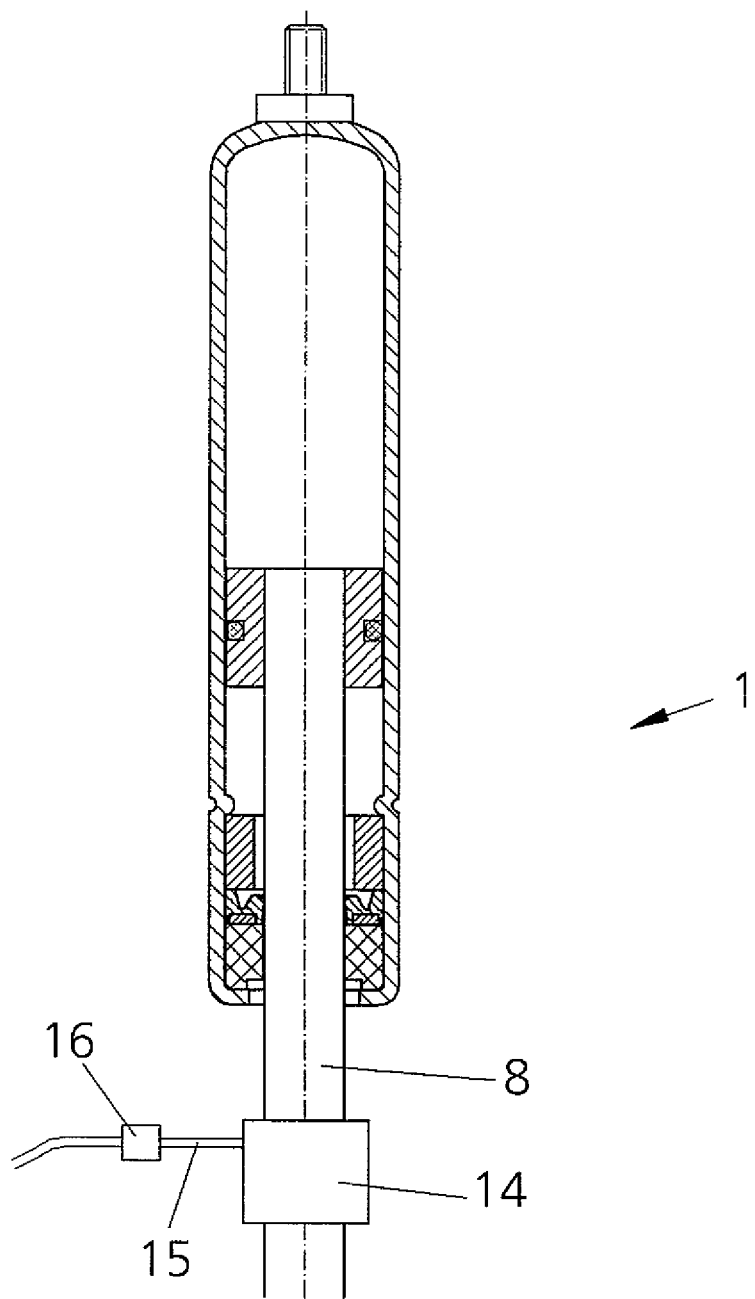
FIG. 13 is a thirteenth embodiment of the invention.

In the embodiment of FIG. 13, the sensor device 14 is accommodated in the area of the piston rod 8 that remains outside the cylinder. Its object is to determine the extension force of the piston-cylinder unit 1. The filling pressure of the piston-cylinder unit 1 can be determined by the geometry of the piston rod 8 and the measured extension force. The data for controlling and the power supply for the sensor device 14 are carried out via line 15. The sensor device 14 can comprise, e.g., a dynamometer or DMS sensor.

Figure 14:
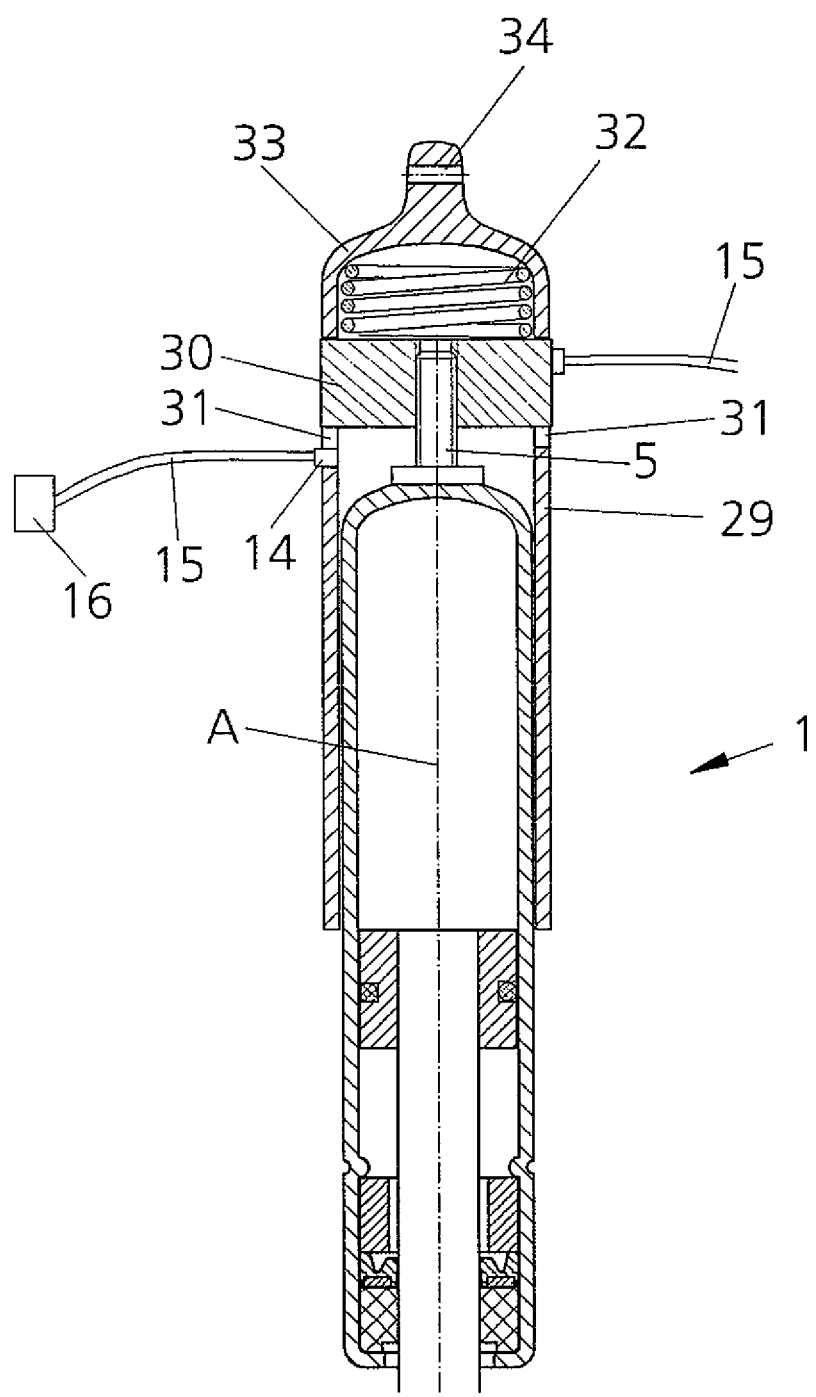
FIG. 14 is a fourteenth embodiment of the invention.

In FIG. 14, the piston-cylinder unit 1 is arranged so as to be axially displaceable in a cover tube 29. The first connection element 5 is located in the cover tube 29 and is connected to a pin 30 arranged transverse to the center longitudinal axis A. The pin 30 extends through two elongated holes 31 in the cover tube 29 so that the cover tube 29 is connected to the piston-cylinder unit 1 so as to be fixed with respect to rotation relative to it. The axial movement path of the piston-cylinder unit 1 relative to the cover tube 29 is fixed by the length of the elongated holes 31. A spring element 32 is arranged at the side of the pin 30 opposite the piston-cylinder unit 1 and is supported at the base 33 of the cover tube 29 and exerts a force against the pin 30 which is less than the extension force of the piston-cylinder unit 1. A third connection element 34 in the form of a knuckle eye is formed at the base 33. However, it can be seen that a threaded stem can be formed at the base 33, and a ball socket, a knuckle eye or another suitable connection component can be arranged on this threaded stem.

If the internal pressure of the piston-cylinder unit 1 drops below a fixed value, the spring element 32 can push the pin onto, or into the vicinity of, the sensor device 14 which is arranged in proximity to the end of one of the elongated holes 31 remote of the base 33 and is connected to the control device 16 by the at least one line 15. The control device 16 can then generate an error message. The sensor device 14 can comprise the elements described above, e.g., DMS sensor, dynamometer, Hall sensor, micro switch, etc.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. it is the intention, therefore, to be limited only as indicated by the scope of the claims appended hereto.

We claim:

1. A piston-cylinder unit having a center longitudinal axis, comprising:
    a cylinder filled with a fluid having a first end;
    a piston displaceabley arranged in the cylinder that divides the cylinder into a first work space remote of the first end and a second work space proximate to the first end;
    a guiding and sealing device;
    a piston rod arranged at the piston that projects through the first work space and is guided out of the cylinder concentric to the center longitudinal axis at a second end opposite the first end so as to be sealed by the guiding and sealing device;
    a dividing piston having a sealing ring that divides the second work space into a first partial space near the piston and a second partial space remote of the piston; and
    a sensor device arranged directly on an outside surface of the piston-cylinder unit and configured to detect a position of the dividing piston in the cylinder for indirect detection of an internal pressure of the piston-cylinder unit.

2. The piston-cylinder unit according to claim 1, further comprising:
    a spring element accommodated in the second partial space arranged between the dividing piston and the closed first end,
    wherein a stroke of the dividing piston in direction of the piston is limited by at least one recesses in the cylinder, and
    the sensor device is arranged between the recess and the closed first end.

3. The piston-cylinder unit according to claim 2, wherein the sensor device comprises a magnetic sensor configured as one of a Hall sensor and a reed sensor.

4. The piston-cylinder unit according to claim 3, wherein the dividing piston comprises a ferromagnetic material.

5. The piston-cylinder unit according to claim 2, wherein the sensor device comprises a coil, wherein the coil is part of a resonant circuit whose other components are accommodated in a control device.

6. The piston-cylinder unit according to claim 2, wherein the sensor device comprises a capacitor, wherein the capacitor is part of a resonant circuit whose other components are accommodated in a control device.

7. The piston-cylinder unit according to claim 2, wherein the sensor device comprises a path sensor configured as a magnetic foil sensor,
    wherein the dividing piston is constructed as a magnet.

8. The piston-cylinder unit according to claim 2, wherein the sensor device comprises a primary coil and at least one secondary coil,
    wherein the primary and secondary coils are operated as transformers.

* * * * *